Dec. 19, 1967 S. R. HAWKINS ETAL 3,358,463
INTEGRATED SUPERCONDUCTING MAGNET-CRYOSTAT SYSTEM
Filed July 15, 1966 2 Sheets-Sheet 1

INVENTORS.
SAMUEL R. HAWKINS
JAMES H. HARSHMAN
BY
George C. Sullivan
Agent

INVENTORS.
SAMUEL R. HAWKINS
JAMES H. HARSHMAN
BY George Sullivan
Agent 3,358,463

INTEGRATED SUPERCONDUCTING MAGNET-CRYOSTAT SYSTEM

Samuel R. Hawkins and James H. Harshman, Cupertino, Calif., assignors to Lockheed Aircraft Corporation, Burbank, Calif.

Filed July 15, 1966, Ser. No. 565,458
6 Claims. (Cl. 62—45)

ABSTRACT OF THE DISCLOSURE

This invention comprises an integrated superconducting magnet-cryostat which provides convenient optical access through its magnetic field. Weight and size are reduced through an improved design and through the use of multi-layer insulation.

The present invention relates in general to a superconducting magnet-cryostat system and in particular to improved integrated superconducting magnet-cryostat system for material analysis and optical research.

Since the discovery of high-field superconducting magnets and superconductors it has been possible to generate steady magnetic fields in excess of 100 kg. with very little power input by using lightweight, compact superconducting solenoids. In the past, however, superconducting solenoids, were operated in liquid helium Dewars of conventional design. Such systems are normally very heavy and unwieldly and offer only partial access to the magnetic field which makes them very inconvenient for many uses such as an optical research instrument.

It is the object of the present invention to provide an improved superconducting magnet-cryostat which is integrated into a single lightweight package and which provides convenient access into its magnetic field.

Another object of the present invention is to provide an improved superconducting magnet-cryostat which provides convenient optical access through its magnetic field.

Another object of the present invention is to provide a magnet-cryostat system which is highly portable and which can be easily transported over any distance while filled with liquid helium and the magnet is energized.

One feature of the present invention is the use of multilayer insulation to decrease the liquid helium boil-off and thereby increase the efficiency of the system.

Another feature of the present invention is in the use of a pre-coolant exhaust tube to eliminate the necessity of tipping the cryostat to remove the pre-coolant liquid.

Another feature of the present invention is the provision of carrying the current leads through the venting tube to reduce heat leakage conducted into the cryostat by the leads.

Another feature of the present invention is the provision of insulated optical window inserts to reduce heat leakage through the windows.

Figure 1:
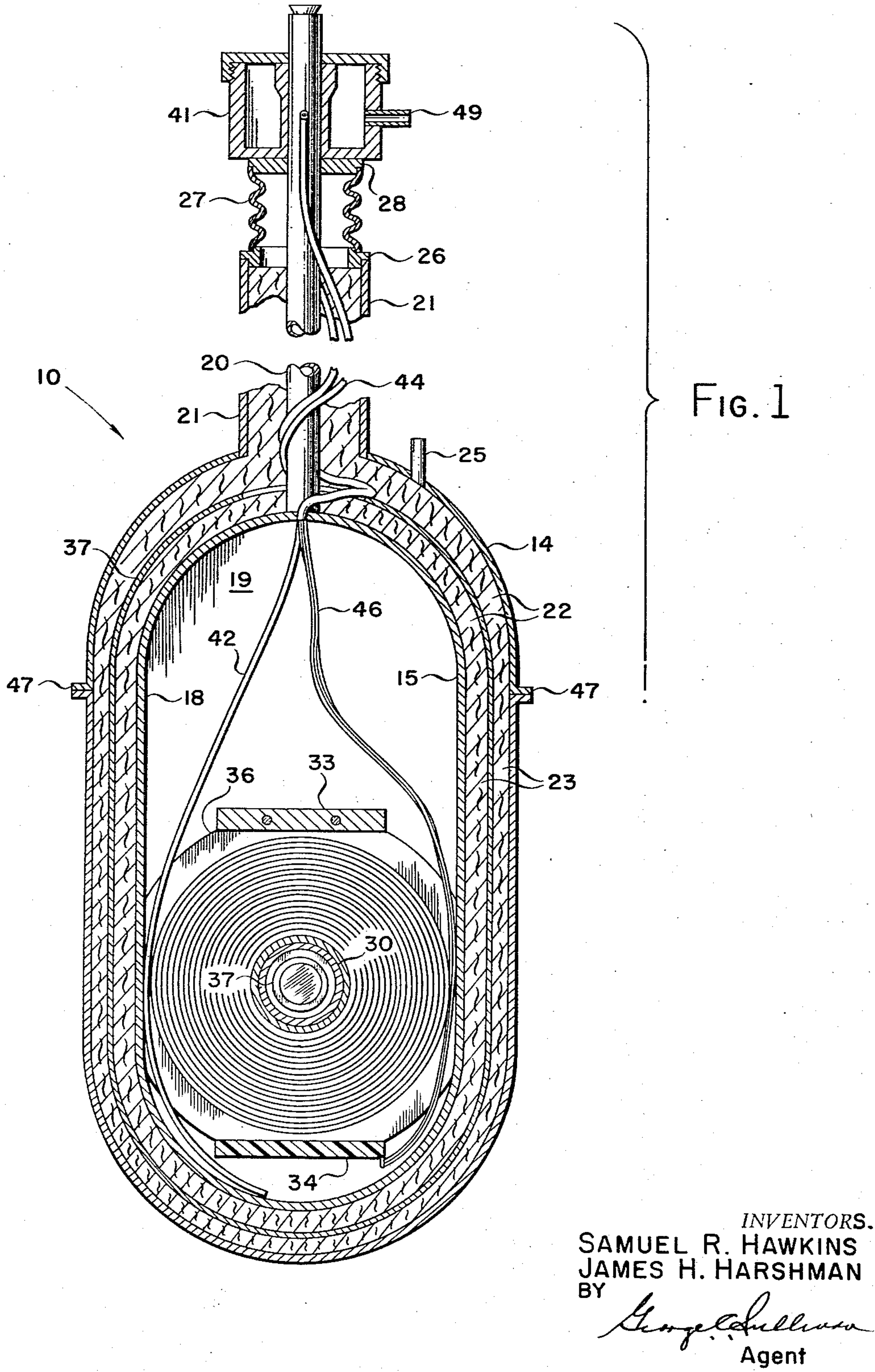
Figure 2:
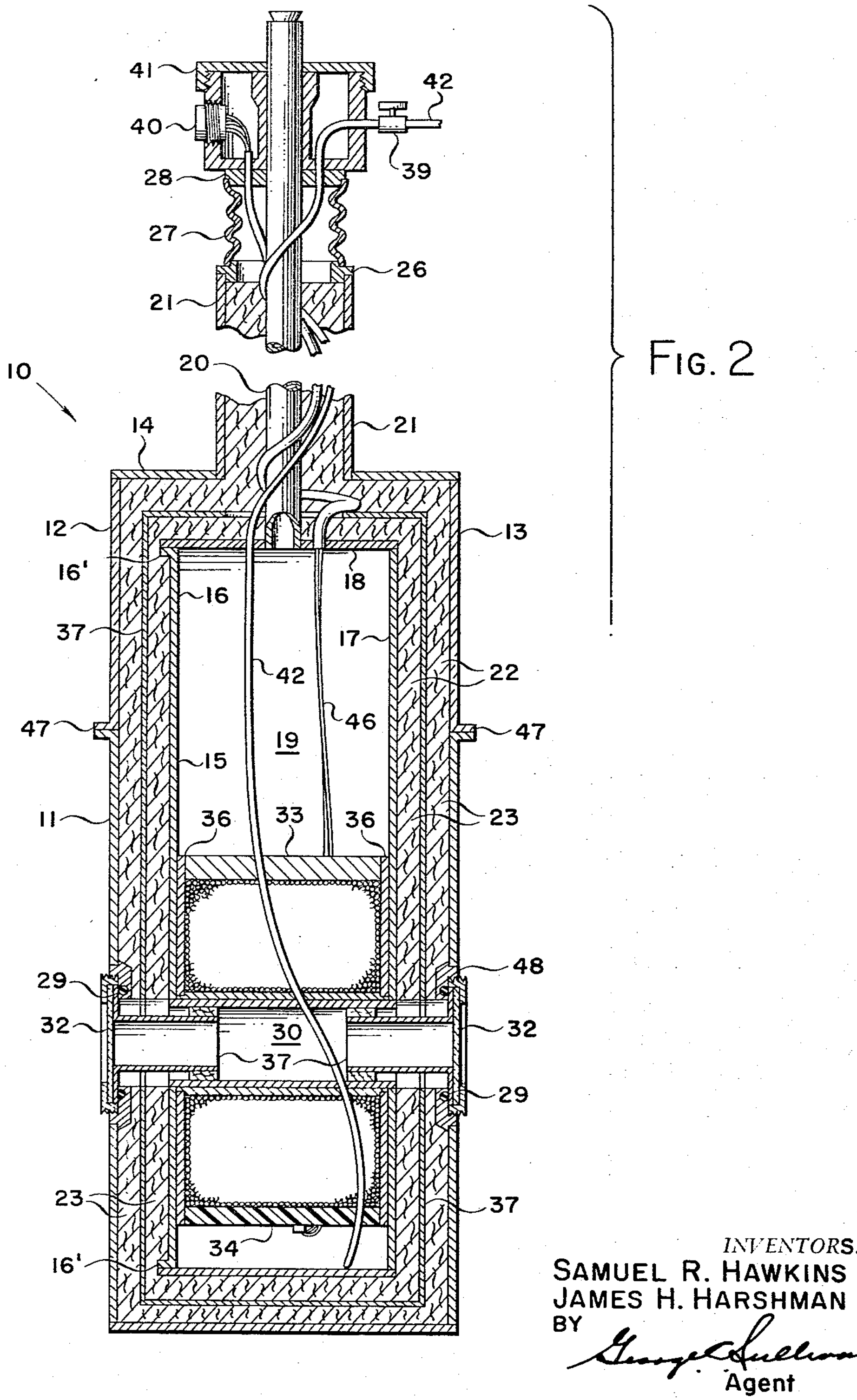

These objects and features and other objects and features of the present invention will become evident to those skilled in the art of superconducting magnets and cryostats after a careful perusal of the following specification, claims and drawings, of which:

FIGURE 1 is a front sectional view, partly in elevation, of one embodiment of a superconducting magnet-cryostat combination, and FIGURE 2 is a side sectional view, partly in elevation, of the magnet-cryostat combination of FIGURE 1.

Referring now to the drawings, a superconducting magnet-cryostat system generally shown at 10 is basically made up from an airtight outer wall 11 and an airtight inner wall shell 15. The outer wall shell 11 comprises generally an oblong shaped outer main body case 14 having its upper and lower portions semi-circular in shape. The outer main body case 14 is closed by a front plate 12 and back plate 13 secured thereto by welding to form an airtight container. The inner shell 15 is generally constructed in a similar manner to outer shell 11. Inner shell 15 comprises a main inner body case 18 which is closed by an inner face plate 16 and an inner back plate 17 welded thereto to form an airtight container. It is noted that inner front plate 16 is flanged at its periphery and this flanged portion 16′ is fitted within and welded to inner main body case 18. This is done so that if it is necessary to have access into the coolant reservoir 19 of the inner shell 16 then it is merely necessary to grind down the weld joint on the edge of the flange 16′ to easily remove inner front plate 16. The semi-circular portions of main body cases 14 and 18 are to reduce weld joints, to make a stronger unit, to eliminate sharp corners, and eliminate, if possible, any three-cornered weld joints.

Both the upper sections of outer shell 14 and inner shell 18 are provided with openings generally centered along the central axis of the cryostat from top to bottom. A hollow cylindrical fill tube 20 is secured as by welding to the opening provided in the inner shell 18. Fill tube 20 extends up through the opening in the outer wall shell 14 and is surrounded at its lower portion by a cylindrical neck assembly 21 mounted on the upper section of outer shell 14 as by welding. A convenient apertured bellows support ring 26 is welded to the top of neck assembly 21.

The inner and outer shells 15 and 11 are physically connected together by means of a bellows 27 and bellows cap 28. Bellows 27 is secured as by welding to the outer edge of bellows ring 26. Bellows support cap 28 is provided with a convenient aperture to accommodate fill tube 20 in a close fit. The joint between the inner surface of the aperture in support cap 28 and fill tube 20 is then welded in an airtight manner. Likewise, bellows 27 is welded to the outer edge of bellows support cap 28.

To provide maximum insulation for the cryostat 10, insulation 23 comprising alternate layers 23 or aluminized Mylar and fiberglass paper are wrapped completely around inner shell 15 and fill tube 20 up to bellows support ring 26. The interior space 22 between the outer and inner shells may be evacuated by means of a convenient vacuum valve 25 on the top portion of outer shell 14.

The face plates 12 and 16 and back plates 13 and 17 of both the outer and inner shells are each provided with aligned ports or openings. A hollow cylindrical support member 30 is welded to the ports in inner face plate 16 and inner back plate 17. Mounted on support 30 is a superconducting solenoid coil former 36 made of, for example, hardened copper. The superconducting solenoid itself is made of a multiplicity of turns of superconductive wire, for example, Nb 25%, Zr wire wound around the coil former 36. A convenient circuit board 34 is mounted on the outer periphery of the end plates of form 36 at its lower portion in relation to its position within the system. A protection plate 33 is mounted on the upper portion of coil former 36 between the end plates of the coil former 36 to protect the brittle superconducting wires from any damage which could occur by accidental dropping of any object, for example, the helium transfer tube, into the coolant chamber through fill tube 20.

To provide for physical and optical access into the magnetic field, a pair of optical window inserters 37 are provided. The inserters are generally hollow cylinders provided with a flanged outer end. The flanged portion is adapted to receive an optical window 32 on its outer surface. The outer portion of the cylinder is covered with insulation to reduce the possibility of heat flow into the magnetic field. The inserts 37 with the windows 32 are mounted on the outer surface of face plate 12 and back plate 13 by any convenient manner, as for example, threaded mounts 46. O-ring seals 29 maintain a vacuum seal.

Mounted around fill tube 20 at its upper end adjacent to bellows support cap 28 is an electrical and exhaust vent junction box 41. Junction box 41 is provided with a pre-coolant exhaust nozzle 39 extending out one side thereof and an electrical feedthrough 40 extending out the other side. Pre-coolant exhaust nozzle 39 is mated at its inner end to a pre-coolant exhaust tube 42 which is positioned around fill tube 20 in a serpentine manner down into the cryostat reservoir through a vacuum tight port provided in bellows support cap 28 and is terminated at the very bottom portion of the cryostat. Electrical energy is provided for the superconducting magnet at circuit board 34 via electrical wires 46 which interconnect the two. Electrical wires 46 are carried from junction box 41 down into the liquid reservoir through a boil-off vent tube 44 which also is wound around fill tube 20 in a serpentine fashion and terminates at an entrance port provided in the upper portion of inner shell 18.

In order to obtain efficient utilization of the cooling capacity of the boil-off gas which is vented through vent tube 44, a heat exchanger 37 made from a layer of copper, the shape of the inner and outer shell, is positioned within vacuum space 22 about one-third of the distance between inner shell 15 and outer shell 11. As best seen in FIGURE 2 cooling vent 44 is wrapped around the top of heat exchanger 37.

In actual construction of outer shell 11, the front plate 12, back plate 13 and main body core 14 are made in two pieces which are joined at the flange 47 as by welding. The reason for this arrangement is to provide accessibility into the inner shell 15. The weld joint at flange 47 is ground down and the upper portion of outer shell 11, including neck 21, ring 26, bellows 27 and bellows cap 28, are lifted up. Inner shell 15 may then be lifted out of the lower portion of outer shell 11.

In order to prepare the superconducting magnet for operation, the vacuum space 22 between the outer and inner chambers is first pumped down to about $10^{-4}$ torr. After the vacuum pumpdown the coolant reservoir 19 of inner shell 15 can be filled with the pre-coolant, for example, liquid nitrogen, after which the vacuum pump is generally removed and the vacuum port 25 is sealed off. Since the boil-off rate for liquid nitrogen is very low, this can be done several hours before transferring the liquid helium into the inner chamber. This is to assure that the insulation heat exchanger 37 and the multilayer insulation 23 have reached their equilibrium temperature distributions. This process can be greatly accelerated if the inner chamber is completely filled and the liquid nitrogen is then forced out of vent tube 44 for several minutes. The liquid nitrogen subcools the copper heat exchanger 37 and the insulation 23 resulting in considerable savings in liquid helium.

The reservoir 19 is then emptied through the pre-coolant exhaust tube 42 by pressurizing the reservoir 19 with a gaseous helium or nitrogen to force the pre-coolant liquid to flow out. The liquid helium is now transferred into the reservoir 19. If the boil-off gas is forced to flow through the vent system 44 during the transfer instead of being allowed to escape back out the fill tube 20 the cool-down of the insulation is greatly accelerated and the rate of boil-off will be very near its equilibrium value by the time the cryostat is filled. If this is not done, several hours will be required for the boil-off rate to reach its equilibrium value. It has been found that using the above procedure the liquid helium boil-off rate is about ¼ liter per hour immediately after the transfer is completed and only slightly less than this several hours later. Thus, if we assume that it is desirable to keep at least ½ liter of liquid helium in the cryostat at all times, the magnet can be operated up to 12 hours between fillings, depending of course upon the number of times the magnet must be energized.

What has been shown then, is an improved integrated cryostat-magnet system which comprises a superconducting solenoid of rather special design contained within a cryostat which was essentially built around the magnet. This has resulted in an extremely lightweight, highly portable system which can be used for a wide variety of applications due to its easily accessible core.

What is claimed is:

1. An integrated superconducting magnet-cryostat apparatus including:
- an inner vacuum tight shell defining a low temperature coolant reservoir;
- an outer vacuum tight shell surrounding and spaced from said inner shell;
- a coolant fill tube extending through said outer shell and into said inner shell;
- a neck assembly mounted on said outer shell and surrounding and spaced from said fill tube;
- the space between said outer shell and neck assembly defining with said inner shell and fill tube a vacuum space;
- support means connected between said neck assembly and said fill tube for supporting said inner shell within said outer shell in a spaced relation;
- a superconducting device including a magnetic field suspended within said coolant reservoir between the walls of said inner shell;
- and optical access means provided in each of said outer and inner shells to permit optical access through the magnetic field of said superconducting device.

2. The apparatus according to claim 1 further including a coolant exhaust tube, means for connecting said exhaust tube, from the bottom of said coolant reservoir through said inner and outer shell and a coolant exhaust nozzle connected to the coolant exhaust tube at its outer end.

3. The apparatus according to claim 2 further including a junction box mounted over said support means and surrounding a portion of said fill tube extending out of said support means, an electrical feedthrough mounted in said junction box, current carrying means connected between said electrical feedthrough and said superconducting device for supplying electrical current thereto.

4. The apparatus according to claim 3 further including a vent tube connected between said support means through said inner shell for venting boil-off gases from said coolant reservoir.

5. The apparatus according to claim 4 wherein said current carrying means are disposed within said vent tube from said junction box into said coolant reservoir thereby reducing heat flow into said coolant reservoir along said current carrying means.

6. The apparatus according to claim 5 further including insulation means surrounding said inner shell, said insulation means including alternate layers of aluminized Mylar and fiberglass paper.

References Cited

UNITED STATES PATENTS

| | | | |
|---|---|---|---|
| 3,119,238 | 1/1964 | Chamberlin et al. | 62—45 |
| 3,296,825 | 1/1967 | Kanzig | 62—514 |
| 3,314,773 | 4/1967 | Deiness | 62—514 |

LLOYD L. KING, *Primary Examiner.*